(12) United States Patent
Cook

(10) Patent No.: US 7,194,278 B1
(45) Date of Patent: Mar. 20, 2007

(54) METHOD AND SYSTEM FOR MANAGING DEVICE FUNCTIONS BASED ON LOCATION

(75) Inventor: Fred S. Cook, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 392 days.

(21) Appl. No.: 09/716,342

(22) Filed: Nov. 20, 2000

(51) Int. Cl.
*H04Q 7/20* (2006.01)

(52) U.S. Cl. ............... 455/461; 455/456.1; 455/456.3; 455/418; 455/419

(58) Field of Classification Search ............... 455/461, 455/456.1–456.6, 418–420, 456, 414, 565, 455/466, 414.1
See application file for complete search history.

(56) References Cited

U.S. PATENT DOCUMENTS

| | | | |
|---|---|---|---|
| 4,845,741 A | | 7/1989 | Fourdraine |
| 5,442,805 A | | 8/1995 | Sagers et al. ............... 455/33.1 |
| 5,650,770 A | | 7/1997 | Schlager et al. |
| 5,778,304 A | * | 7/1998 | Grube et al. ............. 455/456.4 |
| 5,794,142 A | * | 8/1998 | Vanttila et al. ............. 455/419 |
| 5,878,115 A | | 3/1999 | Valentine et al. |
| 5,950,125 A | | 9/1999 | Buhrmann et al. |
| 5,963,130 A | | 10/1999 | Schlager et al. |
| 5,966,655 A | * | 10/1999 | Hardouin ..................... 455/418 |
| 5,978,673 A | | 11/1999 | Alperovich et al. |
| 6,088,598 A | | 7/2000 | Marsolais |
| 6,122,486 A | * | 9/2000 | Tanaka et al. ................. 455/68 |
| 6,198,390 B1 | | 3/2001 | Schlager et al. |
| 6,285,891 B1 | * | 9/2001 | Hoshino ..................... 455/567 |
| 6,343,212 B1 | * | 1/2002 | Weber et al. ............ 455/404.1 |
| 6,343,213 B1 | * | 1/2002 | Steer et al. .................. 455/411 |
| 6,360,101 B1 | * | 3/2002 | Irvin ........................ 455/456.6 |
| 6,421,544 B1 | * | 7/2002 | Sawada ....................... 455/565 |
| 6,424,839 B1 | * | 7/2002 | Bruzzone ................. 455/456.6 |
| 6,438,385 B1 | * | 8/2002 | Heinonen et al. ........... 455/501 |
| 6,490,455 B1 | * | 12/2002 | Park et al. ................ 455/456.4 |
| 6,496,692 B1 | * | 12/2002 | Shanahan ................... 455/418 |
| 6,505,123 B1 | * | 1/2003 | Root et al. ..................... 702/3 |
| 6,539,230 B2 | * | 3/2003 | Yen .......................... 455/456.1 |
| 6,556,819 B2 | * | 4/2003 | Irvin ........................... 455/410 |

(Continued)

FOREIGN PATENT DOCUMENTS

WO    WO 99/67961    12/1999

OTHER PUBLICATIONS

Network Computing / Workshop / Mobile & Wireless Technology / The Bluetooth Invasion Begins, http://www.nwc.com/1206/1206ws3.html, printed from the World Wide Web on Mar. 21, 2001.
Network Computing / Workshop / Mobile & Wireless Technology / The Bluetooth Invasion Begins, http://www.nwc.com/1206/1206ws32.html, printed from the World Wide Web on Mar. 21, 2001.

(Continued)

*Primary Examiner*—Jean Gelin
*Assistant Examiner*—Khawar Iqbal

(57) ABSTRACT

A method and system for altering the functionality of a device based on location. When the device is in a designated location, the device may receive a control signal specific to the location. The control signal may cause the device to change its control logic (such as application layer logic) so as to change the responses that the device has to various primitives or to change the primitives that the device employs in carrying out various functions. When the device leaves the designated area, the device may then revert to a normal state of operation.

26 Claims, 4 Drawing Sheets

U.S. PATENT DOCUMENTS

| | | | |
|---|---|---|---|
| 6,580,372 B1* | 6/2003 | Harris | 340/686.6 |
| 6,597,895 B1* | 7/2003 | Maeda | 455/88 |
| 6,625,455 B1* | 9/2003 | Ariga | 455/456.1 |
| 6,643,517 B1* | 11/2003 | Steer | 455/456.4 |
| 6,694,143 B1 | 2/2004 | Beamish et al. | 455/456.1 |
| 6,773,344 B1* | 8/2004 | Gabai et al. | 463/1 |
| 6,832,093 B1* | 12/2004 | Ranta | 455/456.4 |
| 6,993,423 B2* | 1/2006 | Inman et al. | 701/49 |
| 7,043,286 B1* | 5/2006 | Leason | 455/701 |
| 2001/0031641 A1* | 10/2001 | Ung et al. | 455/456 |
| 2002/0059434 A1* | 5/2002 | Karaoguz et al. | 709/228 |

OTHER PUBLICATIONS

Yegani, P. and Tiedemann, E., "E911 Phase II Support for TIA/EIA-95-B," TR45.5.2/98.9.14._, Sep. 14-18, 1998.

Soliman, S. and Wang, J., "Position Location Signaling Protocol," TR45.5/98.09.04._, Sep. 14-18, 1998.

CDMA Tiered Services Stage 1 Description, Version 1.06, pp. 1-11, Oct. 20, 1998.

Caronni et al., Virtual Enterprise Networks: The Next Generation of Secure Enterprise Networking, printed from the World Wide Web at least as early as Dec. 1, 2000.

* cited by examiner

METHOD AND SYSTEM FOR MANAGING DEVICE FUNCTIONS BASED ON LOCATION

FIELD OF THE INVENTION

The present invention relates to communications and, more particularly, to functions that are performed by devices such as mobile subscriber stations for example.

BACKGROUND

The advent and growth of wireless communications has ushered in a new era of convenience and productivity. Interactions that once commonly required a landline connection to a communications network are now possible with seeming disregard for physical location and physical connections. Today, it is possible for a user operating a suitable mobile terminal to engage in both voice and data communications at virtually any location. Personal and business communications can therefore be conducted more quickly and with far fewer restrictions than previously possible.

Unfortunately, however, the convenience of wireless communications has given rise to other concerns. One concern, for instance, is the very fact that wireless communications can occur in places where such communications were previously not possible, and often in places where such communications are undesirable. In theatres and churches, for instance, obtrusive ring signals and telephone conversations may be considered inappropriate.

Another concern stems from the fact that, as the popularity of wireless communications continues to grow, the number and types of wireless communication terminals continues to grow as well. Today, a person may regularly employ two or more wireless communication terminals, such as a cellular telephone, a pager, a personal digital assistant (PDA), a notebook computer, and even an infrared remote control. This proliferation of wireless communication terminals gives rise to complexity and clutter.

SUMMARY

The present invention provides a method and system for changing the functionality of a device such as communication terminal based on the location of the device. In an exemplary embodiment of the invention, when a device is in a designated location, the device may receive a control signal that indicates or embodies a change of control logic specific to the location. The device may then employ the changed control logic so as to function differently in the designated location than in other locations.

An exemplary device may be capable of communicating with one or more entities, such as a user and/or a machine. To communicate with an entity, the device employs primitives, which may take various forms. Examples of primitives for communicating with another machine include specific signal structures such as bit strings or tone sequences sent between the device a and the machine. Examples of primitives for communicating with a user include physical inputs to the device (e.g., actuation of specific keys, eye or hand movement or other physical motions, or speech signals, etc.), and perceptible outputs from the device (e.g., sounds emitted from a speaker, pixels lit on a display, LEDs or other lights powered, etc.) A primitive may be a single primitive or a particular combination of primitives.

The exemplary device may include a set of control logic that may correlate functions with primitives. For instance, the control logic may establish how the device should functionally respond to receipt of a particular primitive. As another example, the control logic may establish what particular primitive the device should employ so as to carry out a particular function.

According to the exemplary embodiment, the device may receive a control signal that is associated in some way with the current location of the device. The control signal may, for instance, be emitted regularly (e.g., periodically or continuously) by one or more low-power transmitters within an area (so that the radiation pattern of the transmitter(s) may effectively define the boundaries of the location.) Alternatively, a location message may be communicated between the device and another entity, so as to ultimately cause an entity to send the control signal to the device in response to the fact that the device is currently in a designated location. The control key may carry a control signal key, which may define or identify a modification to control logic to be made by the device.

In response to the control signal, the device may be programmed to change its control logic so as to alter the relationship between functions and primitives. By way of example, the control logic may normally cause the device to carry out a first function in response to a given primitive, and, in response to the control signal, the control logic may be changed so as to cause the device to carry out a second function (different than the first function) in response to the given primitive. As another example, the change to control logic may involve disabling the first function. As still another example, the control logic may normally cause the device to employ (e.g., to send out) a first primitive in carrying out a given function, and, in response to the control signal, the control logic may be changed so as to cause the device to employ a second primitive in carrying out the given function.

In the exemplary embodiment, when the device leaves the location with which the control signal was associated, the changes to control logic of the device may be undone, reverting the control logic back to its normal state for instance. If the control signal had been emitted by a local transmitter, for example, the device may detect the absence of the control signal and may responsively undo the change to its control logic (or may wait a predetermined duration before undoing the change). Alternatively, for example, a location message may again be communicated between the device and another entity, so as to ultimately cause an entity to instruct the device to undo the change.

Thus, in one respect, an exemplary embodiment of the invention may take the form of a method for altering the operation of a device based on location, in which the device receives a control signal and the control logic of the device is responsively change. The change may be an alteration of an application-layer function of the device. The change may be an alteration of a functional response of the device to a given primitive. The change may be an alteration of a primitive that the device employs in carrying out a function.

With the benefit of the exemplary embodiment, numerous device functions may be imposed on a location-specific basis, and a device may be made to operate in a particular manner when the device is in a particular location. For example, a system may be provided for automatically causing cellular telephones, pagers and other such devices to turn off or otherwise dampen their audible alerts (e.g., ringers) when in sensitive areas such as theatres or churches. In this way, the invention can advantageously enable groups that control shared areas to exert some control over noise pollution. Assorted other examples are possible as well.

These as well as other aspects and advantages of the present invention will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Architecture

According to an exemplary embodiment of the present invention, a device may receive a control signal specific to a location in which the device is currently positioned, and the control signal may effect a change of control logic in the device so as to cause the device to operate in a manner that is specific to the location. To accomplish this, (i) a system is preferably provided for conveying to the device a control signal that is associated with a designated location, and (ii) the device is preferably arranged to receive the control signal and to responsively change its control logic so as to embody location-specific logic while the device is in the location.

The designated location may take any of a variety of forms. As examples, and without limitation, the designated location could be a theater, a conference room, a church, a school, a library, a hotel, a hotel room, a stadium, an amusement park, a corporate or college campus, an aircraft cabin, a house, a floor in a building, a room in a building, a stretch of a road, a section of sidewalk in front of a store, or a combination or subset of these or other areas.

Figure 1:
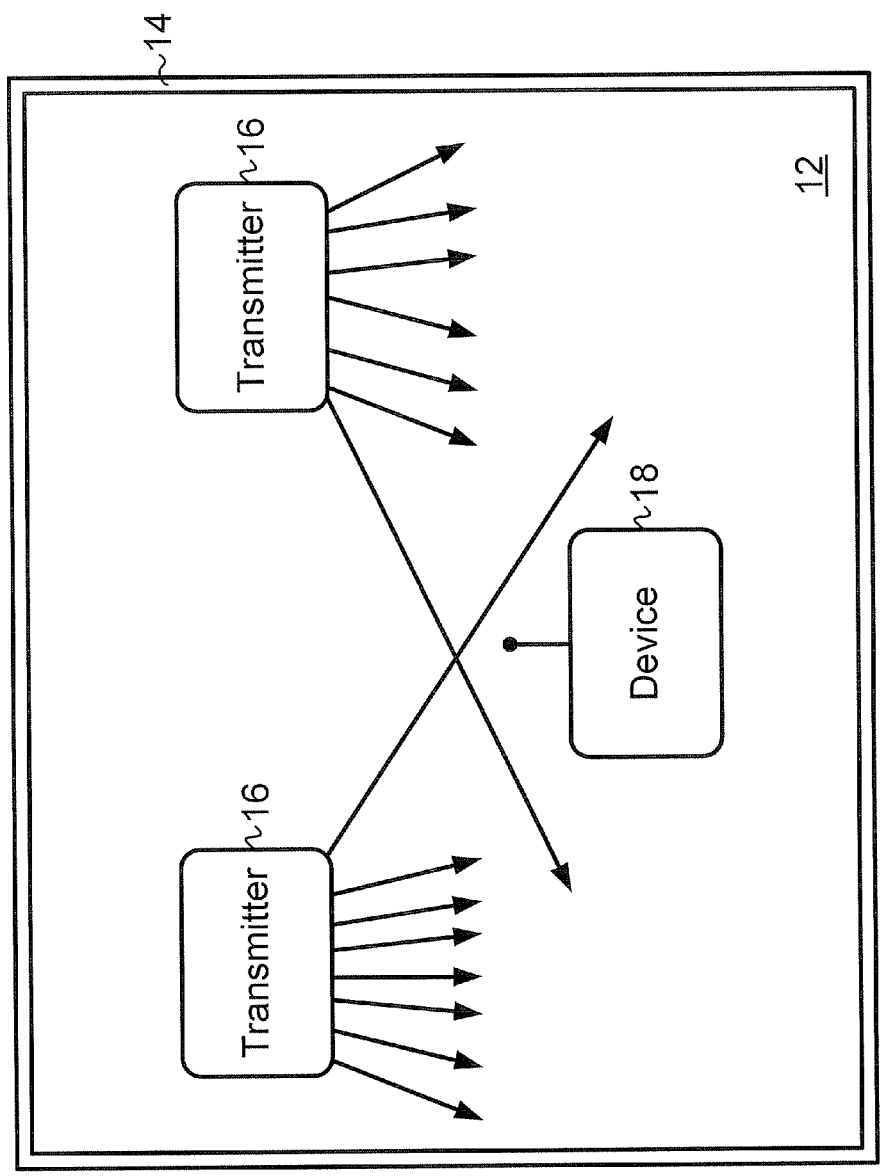
FIG. 1 illustrates an arrangement for providing a location-specific control signal to a device in accordance with an exemplary embodiment of the invention.
Figure 2:
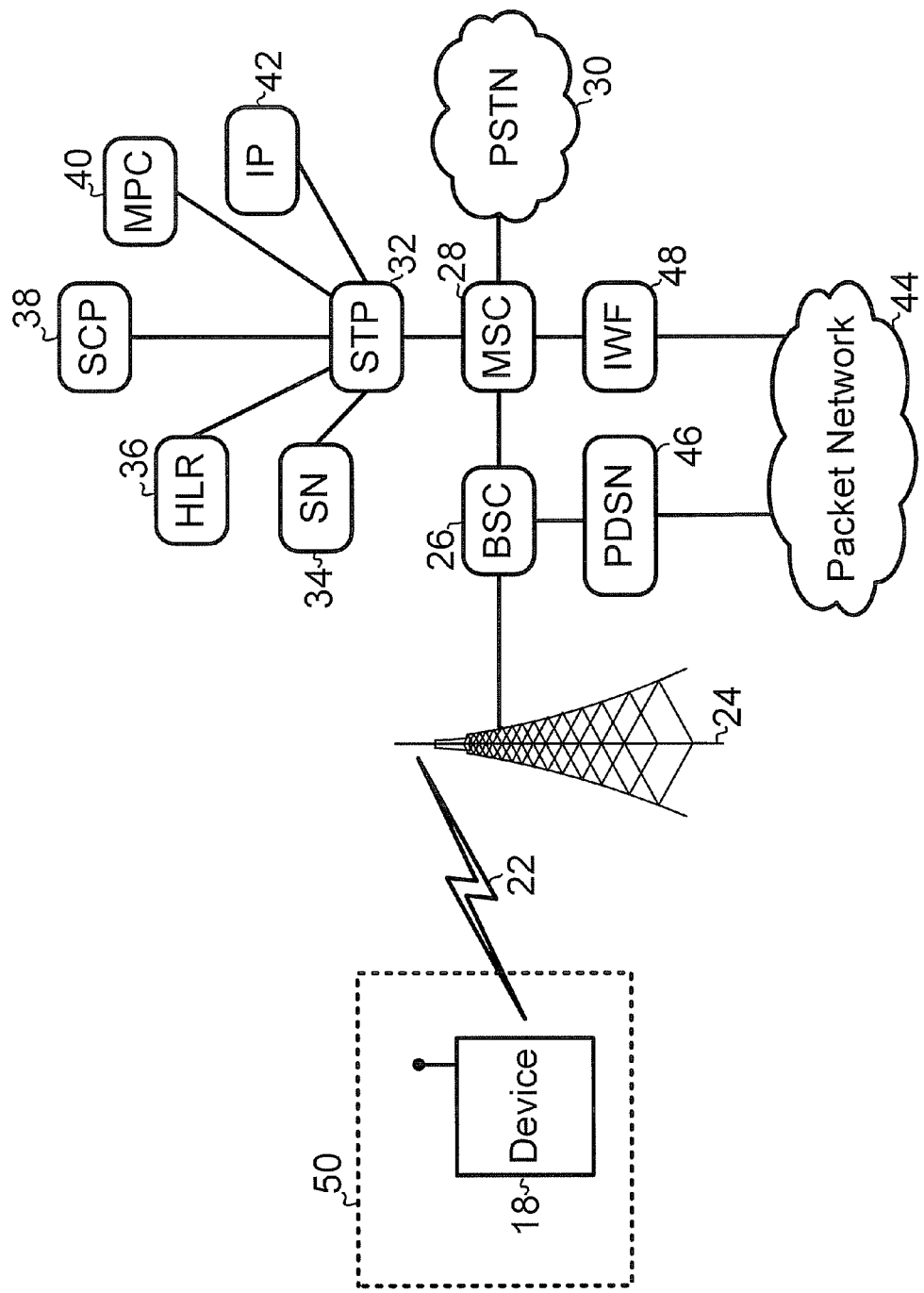
FIG. 2 illustrates another arrangement for providing a location-specific control signal to a device in accordance with an exemplary embodiment of the invention.

FIGS. 1 and 2 illustrate two exemplary arrangements for sending a location-specific control signal to a device. FIG. 1 illustrates an arrangement in which a control signal is emitted locally in the designated area, so that a device may receive the signal when in the designated area but preferably not when outside of the designated area. In this arrangement, the control signal is associated with the designated area because it is emitted in the designated area. FIG. 2 illustrates an alternative arrangement in which a control entity (whether inside or outside the designated area) determines that the device is in the designated area and responsively communicates the control signal to the device. In this arrangement, the control signal is associated with the designated area because it is provided to a device once a determination is made that the device is in the designated area.

It should be understood that the arrangements described herein are shown for purposes of illustration only. Therefore, those skilled in the art will appreciate that other arrangements and other elements (e.g., machines, interfaces, functions, etc.) can be used instead, and some elements may be omitted altogether. Further, elements described herein may be functional entities that could be implemented as discrete components or in conjunction with other components, in any suitable combination and location. Thus, for example, it should be understood that the arrangements shown in FIGS. 1 and 2 are exemplary only, and that variations on these arrangements, or vastly different arrangements, can be provided instead for sending a location-specific control signal to a device.

Still further, various functions described herein as being performed by one or more entities may be carried out by a processor executing an appropriate set of machine language instructions stored in memory. Provided with the present disclosure, those skilled in the art can readily prepare appropriate computer instructions to perform such functions.

Referring first to FIG. 1, there is shown a first exemplary arrangement for providing a control signal to a device when the device is in a designated area. In this example, the designated area is assumed to substantially coincide with a room 12, such as a movie theatre for instance. However, the designated location could take other forms, such as those noted above for instance. For purposes of example, room 12 is shown to include walls 14.

Disposed within room 12, or otherwise positioned so as to transmit into room 12 (such as behind a movie screen for instance), is one or more transmitters 16. These transmitters 16 may take any of a variety of forms suitable for transmitting a signal into room 12 for receipt by a device within the room. By way of example, each transmitter 16 may be an infrared transmitter. Alternatively, each transmitter can be a radio frequency transmitter, operating according to the emerging wireless communications standard known as "Bluetooth" for instance. Many other examples exist as well.

Preferably, the transmitters are or can be set to emit signals that are sufficient to blanket room 12 but that preferably do not interfere with other signals in the room 12 or leak out of the room. (Of course, it is acknowledged that some leakage may occur.) In operation, the radiation patterns of the transmitters will cooperatively define the boundaries of the designated area, which preferably coincide with the boundaries of room 12. At a suitable frequency (such as infrared for instance), the walls 14 of room 12 may restrict the radiation patterns to within room 12. Additionally, an appropriately equipped receiver and test set could be used to test the signal reception level and radiation pattern, and the transmitters may then be adjusted as necessary until a desired radiation pattern and signal level is achieved.

The transmitters 16 can take various forms. By way of example, the transmitters can be infrared transmitters. Alternatively, the transmitters can be radio frequency transmitters, operating according to the emerging wireless communications standard known as "Bluetooth" for instance. Still alternatively, the transmitters could take other forms or could be a combination of these or other forms.

The transmitters are preferably arranged to transmit a particular control signal into the designated area. For this purpose, the transmitters may be coupled to a controller (not shown) such as an appropriately programmed computer or logic circuit for instance, which may send a control signal to the transmitters to be transmitted into the area. Alternatively, the transmitters themselves may embody logic (software, hardware and/or firmware) that causes the transmitters to transmit the control signal into the designated area.

Also shown in room 12 is an exemplary device 18, which is preferably arranged to receive the control signal emitted by transmitters 16. Device 18 may take any of a variety of forms but preferably includes a receiver for receiving the control signal and a processor for responding to the control signal. More details of exemplary device 18 will be provided below. Although FIG. 1 shows only one device 18 within the designated area of room 12, there may in fact be many devices 18 within the room at a given time. Further, the devices may vary in form from one another.

In order for device 18 to be able to receive a control signal emitted by transmitter 16, the receiver of the device should be compatible for communications with the transmitter 16. Phrased alternatively, the transmitter and receiver should be able to communicate via a common interface with each other. The interface may take any form, whether landline and/or wireless, and whether circuit-switched or packet-switched for instance.

In the exemplary embodiment, the interface between the transmitter and receiver is an air interface (i.e., a wireless interface), and the control signal may be communicated from the transmitter to the device in the infrared or radio frequency bands. Consequently, the transmitter is preferably an infrared or radio frequency transmitter, and the receiver of the device is preferably an infrared or radio frequency receiver. However, the interface could just as well take other forms, in which case the transmitter and/or receiver may take other forms as well. Further, one or more transmitters 16 may be provided for concurrently emitting the control signal in different forms (such as infrared and radio frequency) so as to facilitate concurrent communication with devices 18 in the designated area that have different types of receivers.

Turning now to FIG. 2, there is shown another exemplary arrangement for providing a control signal to a device when the device is in a designated area. In this alternative arrangement, an entity preferably determines that the device is in a particular area and responsively causes a respective control signal to be sent to the device while the device is in the area. The mechanics for determining that the device is in the designated area and for then sending the control signal to the device are not necessarily critical. Therefore, it should be understood that the arrangement set forth in FIG. 2 is provided strictly for purposes of example.

FIG. 2 sets forth a wireless telecommunications network that may operate according to well-known industry standards such as the Electronics Industry Association /Telecommunication Industry Association (EIA/TIA) Interim Standards IS-801, IS-95, J-STD-036, and/or other standards, protocols, recommendations or techniques now known or later developed.

In particular, FIG. 2 depicts a device 18, which communicates via an air interface 22 with a base transceiver substation (BTS) 24. The BTS in turn communicates with a base station controller (BSC) 26, which then communicates with a mobile switching center (MSC) 28. The MSC is then typically coupled to the public switched telephone network (PSTN) 30. Further, by convention, MSC 28 is coupled to an out of band signaling network (e.g., CCS7) that comprises one or more signal transfer points (STP) 32 and that serves to establish a signaling path between MSC 28 and various control entities or platforms. These control entities or platforms may include, for instance, a service node (SN) 34, a home location register (HLR) 36, a service control point (SCP) 38, a mobile position center (MPC) 40, and/or an intelligent peripheral (IP) 42, among others. FIG. 2 also shows that BSC 26 and/or MSC 28 may be coupled to a packet-switched network 44, via a suitable interface such as a packet data serving node (PDSN) 46 or interworking function (IWF) 48, to facilitate data communications with device 18.

Device 18 is shown to be positioned in a particular area 50, which is designated by dashed lines in FIG. 2. Area 50 may, for instance, be defined by a range of latitude and longitude coordinates. Alternatively, area 50 may be defined as a particular cell or sector for instance. Still alternatively, area 50 may take other forms.

In the exemplary embodiment, device 18 may communicate with BTS 24 over air interface 22 according to EIA/TIA IS-95 and may further communicate position determination data messages over the air interface according to EIA/TIA IS-801 or by any other suitable mechanism now known or later developed. The entirety the EIA/TIA IS-95 and IS-801 standards are hereby incorporated by reference.

Device 18 may include a global positioning satellite (GPS) receiver and other functionality suitable for determining its actual position (e.g., latitude and longitude). Pursuant to IS-801, the device may employ the GPS functionality so as to determine its position and may then send to MSC 28 via BSC 26 a position determination data message that indicates the device position. Further, device 18 may be programmed to periodically send such a position determination data message to MSC 28.

MSC 28 may be programmed with a translation table, which is arranged to correlate specific positions to particular control signals. For instance, the translation table may provide that a particular control signal corresponds to area 50 as shown in FIG. 2 and may provide that other particular control signals correspond to other areas. Upon receipt of a position determination data message from device 18, MSC 28 may thus refer to the translation table and may select the respective control signal (possibly after having determined that device 18 is entitled to the service). MSC 28 may then send the control signal to device 18 via BSC 26, BTS 24 and air interface 22.

Alternatively, another entity may function to correlate an indication of position with a control signal and cause the control signal to be provided to the device. For example, BSC 26 may instead include this functionality (e.g., including maintaining and referencing a suitable translation table).

As another example, BSC 26 and/or MSC 28 may be arranged to send a signaling message to some other entity, and that other entity may then cause a control to be sent to the device. For instance, the MSC 28 may be programmed to respond to a position determination data message from device 22 by sending a signaling message via STP 32 to SCP 38. The signaling message may identify the device (e.g., by mobile identification number, if appropriate, for instance) and the position of the device. The SCP may then refer to a subscriber profile table and thereby determine that the device is entitled to location-specific service. In turn, the SCP may refer to a translation table that correlates positions with control signals and may thereby select a control signal corresponding to the current position of the device. The SCP may then send the control signal, via STP 32, MSC 28, BSC 26, BTS 24 and air interface 22, to the device.

Alternatively, for instance, the BSC or MSC might receive location information from device 18 and then forward that information in a data message (e.g., a packet-based message) via PDSN 46 or IWF 48 to a computer (not shown) on packet network 44. The computer may then correlate the location to a control signal and send the control signal via the same or a different channel back to the device.

As still another example, other position determining systems are known in the art or will be developed in the future, and those other systems may be employed instead (e.g., instead of or in addition to use of GPS technology). For example, well-known triangulation techniques may be employed to monitor the location of mobile stations such as device 18 for instance. MPC 40 may then serve to receive and store such position data. In turn, MPC 40 may be programmed to push an indication of the position of device 18 to another entity such as SCP 38 or MSC 28 periodically or in response to a designated stimulus. The MPC and/or the other entity may then be programmed to translate the position to a respective control signal and to then send the control signal to the device.

In the exemplary arrangement of FIG. 2, a control signal that is sent to device 18 via air interface 22 may be sent via any suitable communication channel in the interface. For example, if the device operates according to the well-known CDMA protocol, the control signal may be sent over an MSC-designated CDMA code and frequency as special call control messages. Alternatively, if the device is equipped to engage in data communications (e.g., with a microbrowser) and therefore has a network address (such as an IP address for instance), the control signal may be sent to that network address. Other arrangements are possible as well.

Figure 3:
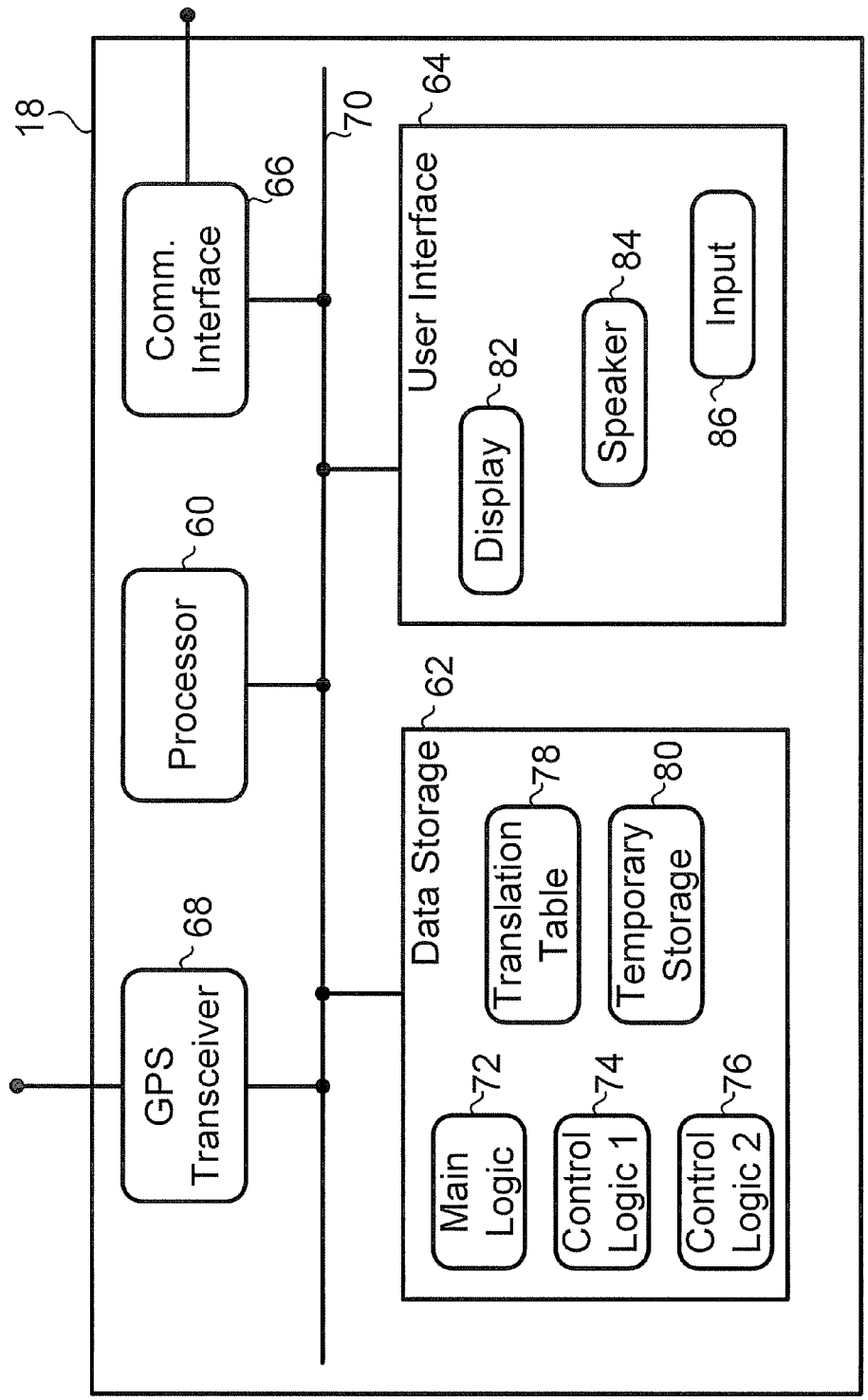
FIG. 3 is a simplified block diagram of a device arranged to operate according to an exemplary embodiment of the invention.

Turning now to FIG. 3, there is shown a simplified block diagram of a device 18 arranged to operate according to an exemplary embodiment of the present invention. As shown in FIG. 3, exemplary device 18 includes a processor 60, a data storage medium 62, a user interface 64, a communications interface 66 and a GPS transceiver 68, each of which may be coupled together via a system bus 70.

Processor 60 may be a microprocessor arranged to execute program instructions and/or may embody hardware or firmware based logic. Data storage medium 62 may be an optical, magnetic and/or other storage such as RAM, ROM, a disk drive or the like and may hold program instructions and other data for execution and use by processor 60. In the exemplary embodiment, data storage medium 62 may include sets of instructions defining (i) a main logic module 72, (ii) a first control logic module 74, and (iii) a second control logic module 76. (There may alternatively be only one set of control logic or many more sets of control logic. Modules 74 and 76 are only shown for purposes of example.) Further, the data storage medium may hold a translation table 78 for correlating control signals with sets of control logic, and a temporary storage segment 80.

User interface 64 may include components to facilitate interfacing with a user. For example, the user interface may include a display 82 (e.g., an LCD display), a loudspeaker 84 (and/or a headphone jack or line-out function), and an input mechanism 86 (e.g., a numeric keypad or one or more other actuators, and/or a microphone). Processor 60 may directly or indirectly control display 82 and speaker 84 and may receive signals resulting from input to input mechanism 86 for instance.

Communications interface 66 may be an interface suitable for receiving a control signal as described above. Thus, communications interface 66 might be an infrared receiver or a radio frequency receiver. Further, to the extent other signaling communication may occur between device 18 and another entity (e.g., to convey location information), communication interface 66 may include a transmitter and/or receiver suitable for conveying the necessary signals. Processor 60 may directly or indirectly control communications via interface 66.

GPS transceiver 68 preferably functions to receive signals from the well-known GPS system, which may function to indicate a relatively precise location of device 18. Processor 60 may directly or indirectly control transceiver 68, and transceiver 68 may provide location signals to processor 60.

Device 60 may be programmed to employ (e.g., make use of) a number of basic physical primitives in carrying out various functions. For instance, display 82 may define an array of pixels that can be turned on or off. These pixels (individually or in various combinations) are an example of primitives. In and of themselves, the pixels may be basic physical elements that do not have meaning. However, device 60 may use the pixels so as to carry out a function such as communicating specific information to a user. For instance, by turning on a particular group of the pixels, the device can present a graphical icon or a word to a user, and, by turning on a different group of pixels, the device may communicate a different message to the user.

As another example, via communications interface 66, the device may be able to communicate particular signal structures, such as a particular sequence of bits for instance. A particular signal structure is another example of a primitive. In and of itself, as a physical signal structure, a signal structure may have no particular meaning. However, the device may use a particular signal structure to convey a particular message. For instance, the device may be programmed to treat the bit sequence 00101110 as a representation of a given message. To convey the given message, the device may communicate that bit sequence, and, to convey another message, the device may communication another bit sequence.

Further, the device may be programmed to carry out a particular function (or, equivalently, functions) in response to a particular primitive (or, equivalently, primitives). For example, one primitive may be actuation of a particular key of input mechanism 86, and another primitive may be actuation of another key or combination of keys on of mechanism 76. The device may be programmed to display a particular graphic on display 82 in response to actuation of the first key, and to send out a signal via communications interface 66 in response to actuation of the other key or combination of keys for instance. Other examples are possible as well.

In the exemplary embodiment, the main logic module 72 in the data storage medium 62 may define instructions to enable processor 60 to engage in physical communication over communication interface 66 and via user interface 64, such as to generate and provide particular primitives or to receive particular primitives. Control logic module 74 may in turn provide higher layer (e.g., application layer) functionality, which may cause the processor to carry out particular functions in response to particular primitives, may cause the processor to generate particular primitives in carrying out particular functions, and so forth. Control logic module 76 may, in turn, define a different set of such control logic than control logic module 74. For instance, while control logic 74 may direct the processor to carry out one function in response to a given primitive, control logic 76 may direct the processor to carry out a different function in response to the same primitive.

As indicated above, translation table 78 may correlate control signals with different sets of control logic. For example, each record of translation table 78 may be keyed to a particular control signal and may then point to a respective set of control logic, such as module 74 or module 76 for instance. Main logic module 72 may include a function call to a set of control logic pointed to by the translation table, so as to facilitate carrying out various application layer functions for instance. One such record in table 78 may be a default record (e.g., not keyed to a particular control signal), which points to control logic module 74 for normal operation. Another such record in table 78 may be keyed to a particular control signal and may point to control logic module 76 for special operation, such as location-specific operation in the exemplary embodiment.

The control signal that processor 60 receives via communications interface 66 may take any of a variety of forms. For instance, the control signal can be a predetermined bit sequence of any desired length, preferably unique to the location at issue. If the control signal is to be transmitted in band (e.g., in the same communications channel via which other signals are being sent to the device), then the signal should preferably be of a form such that processor 60 can detect the signal through conventional or other pattern recognition techniques. With the arrangement described above, translation table 78 may thus readily correlate a plurality of such control signals with respective control logic.

Alternatively or additionally, the control signal may itself embody a set of control logic specific to the location at issue. For instance, the control signal may be a bit stream representative of object code (compiled source code) for carrying out various control-logic functions. In that event, when processor 60 receives the control signal, processor 60 may store the control logic represented by the control signal in temporary storage segment 80 and may set a value in translation table 78 so as to cause main logic 72 to call or otherwise refer to the control logic in the temporary storage segment. Still alternatively, the control signal may embody a set of logic indicating one or more changes that are to be made to the normal control logic of the device, and the main logic module 72 may direct the processor to responsively implement those changes.

Device 18 may also be programmable in other ways so as to load one or more sets of control logic into the device and/or to set values in translation table 78. In this regard, for instance, device 18 may be arranged to communicate via interface 66 or via another interface with an entity such as a personal computer for instance. The other entity may be programmed to provide to the device the necessary control logic and translation table entries.

2. Exemplary Operation

Figure 4:
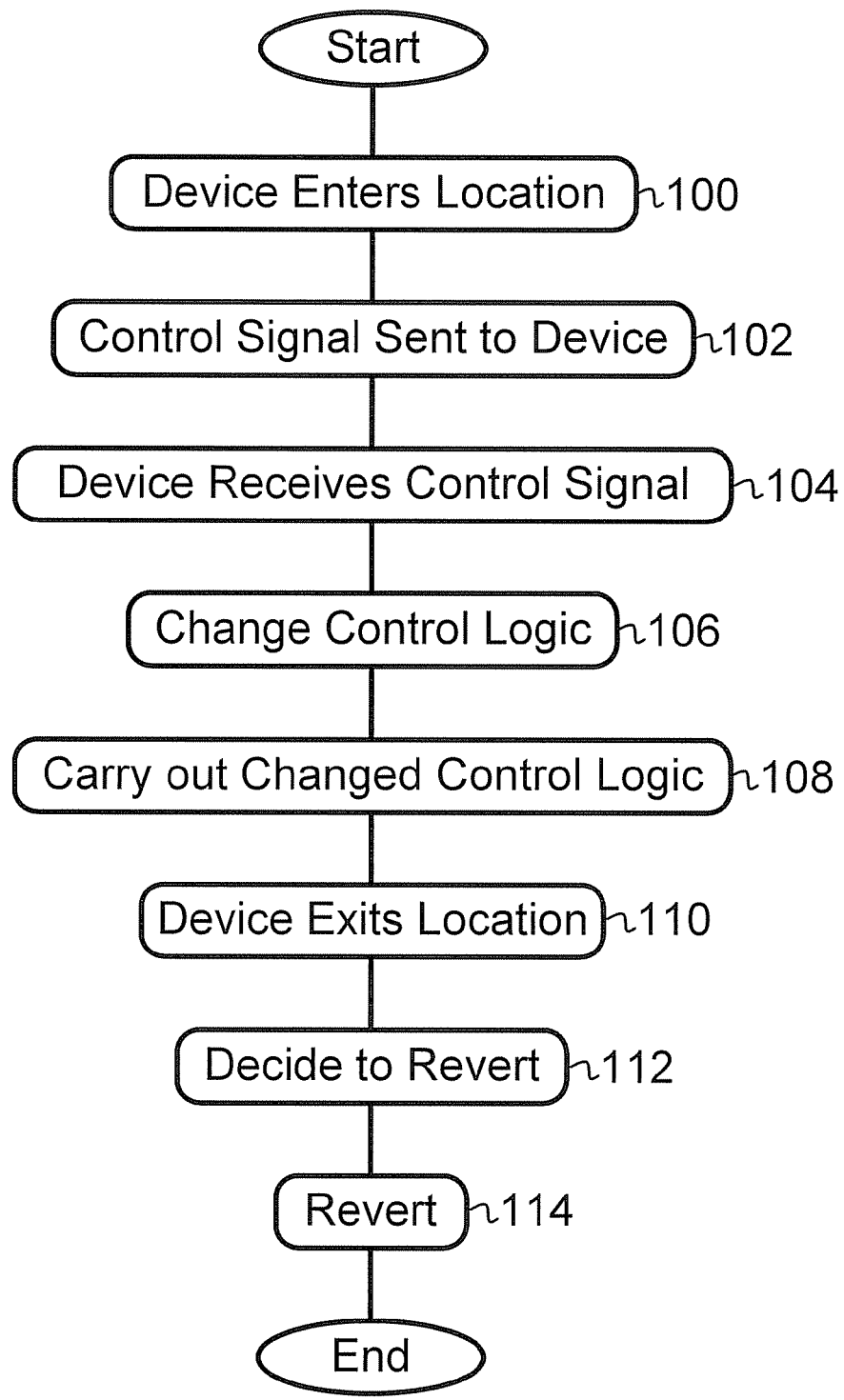
FIG. 4 is a flow chart depicting functional blocks that may be employed in accordance with an exemplary embodiment of the invention.

Referring now to FIG. 4, there is shown a flow chart setting forth a set of functions that may be employed in accordance with an exemplary embodiment of the present invention. For purposes of illustration, the example of FIG. 4 assumes that device 18 is powered on and is programmed with a first set of control logic 74, thereby establishing a first relationship between functions and primitives. (Alternatively, the device may not yet be programmed with such control logic.)

As shown at block 100 in FIG. 4, device 18 then moves into a designated location. In this regard, a person carrying the device may physically move into the designated location, such as room 12 in FIG. 1 or area 50 in FIG. 2 for instance. (Alternatively, if the device has in fact not yet been turned on, this step may involve powering on the device in the designated location. Still alternatively, this step may involve changing the functionality of a device in some way (e.g., initiating an operating system or other application on the device) so as to make the device operable.) Other examples are possible as well.

At block 102, a control signal specific to the designated location is sent to device 18. As indicated above, the control signal can take any of a variety of forms, such as a predetermined code for instance. The control signal may be specific to a device or system in the designated location. For example, to facilitate a change of functionality of the device so as to allow the device to communicate as a remote control with a television in room 12 for instance, a control signal specific to that television may be sent. The control signal might point to or define code that causes processor 60 to send out a predetermined signal to the television in response to actuation of a particular key on the device.

Alternatively, to facilitate a change of functionality of the device so as to allow the device to communicate with a printer in the room, a control signal specific to the printer may be sent. The control signal may point to or define a code that causes processor 60 to communicate via a protocol (e.g., a transport protocol) employed by a the printer, so that information can then be sent from the device to the printer to be printed. If the Bluetooth standard is used for communicating with the printer, the control signal may point to the Bluetooth ID of the printer and then scan methods may be employed to connect to it. Other examples are possible as well.

Further, the control signal does not necessarily have to be unique to the designated location. Rather, multiple locations may be associated with the same control signal. However, in the context of the exemplary embodiment, a given control signal may have a given impact (e.g., in causing a particular change in control logic) on a given device. Therefore, if the same control signal is sent to the same device in two separate locations, the device may be impacted in the same way in both locations. In the television example above, for instance, the same control signal might be sent to the same model device in two separate rooms, where both rooms contain the same model television.

Depending on the arrangement, the control signal may or may not be sent continuously or periodically to the device. In an arrangement such as that shown in FIG. 1, for instance, the control signal might be transmitted from transmitter 16 periodically, such as every second or so. In contrast, in an arrangement such as that shown in FIG. 2, the control signal might be sent just once. Of course, the system can be designed to work in other ways as well.

At block 104, device 18 receives the control signal, via its communications interface 66 for instance. In turn, at block 106, processor 60 responds to the control signal by changing the control logic of the device so as to establish a second relationship between functions and primitives, different than the first relationship. As indicated above, this can be accomplished in a number of ways.

As a general matter, this process may be accomplished by saving the device's existing functional settings (its "normal" state), altering the device's functional settings in accordance with the control signal (to achieve a "temporary configuration" state), and setting a flag in memory to indicate that the device is operating in the temporary configuration state. The flag may indicate the control signal key, for use in comparing to a subsequent control signal for instance.

For instance, the processor may refer to a table such as translation table 78 or to other such logic to select a changed set of control logic already stored in the device, and the processor may switch to employ that changed set of control logic. Alternatively, the processor may be programmed to respond to the control code by sending out a request to another entity, asking for the logic or further instructions to enable an appropriate change in control logic. Further, if the control signal itself embodies executable logic, the processor may store that executable logic in temporary storage segment 80.

The device may be programmed to set a flag in memory (e.g., in temporary storage segment 80, or as part of translation table 78 for instance) indicating that it has received a particular control signal, or that the control signal or a particular change in logic is active. That way, in the event the same control signal is received again by the device, the device may disregard the control signal as the applicable change in control logic has already been made.

In an exemplary embodiment, the device may further be programmed to prompt a user for approval of a change in control logic before the change is made. For instance, processor 60 may cause an approval-prompt message to be displayed on display 82, and a user may signify approval for the change through input mechanism 86. Alternatively, the user could reject the proposed change, in which case processing could end. Likewise, the user may select to discontinue a given set of active control logic if the functionality of that control logic is no longer desired.

At block 108, once the change in control logic is made, the device may then carry out the changed control logic in practice. For instance, in the television example above, the device may then communicate as a remote control with the television. Alternatively, in the printer example above, the device may then send a message or document to the printer to be printed.

At block 110, the device may then exit the designated location. As a result, at block 112, a determination may be made to switch the control logic back to its normal state (or alternatively, to switch to yet another set of control logic specific to a new location into which the device has moved). In turn, at block 114, the device may thus revert back to its normal set of control logic.

The determination to undo a change of control logic may be made in a number of ways. By way of example, in an arrangement where the control signal is sent continuously to the device, as perhaps in FIG. 1 for instance, when the device stops receiving the control signal, processor 60 may determine that the device is no longer in the designated location. For instance, processor 60 may be programmed to reset a timer each time it receives the control signal and to then decrement the timer over time. If the timer reaches zero, then the processor may conclude that the control signal is not being sent anymore and that the device has exited the designated location. Therefore, the processor may conclude that the control logic should be switched back to its normal state. (Additionally, functionality may be provided to allow a user to indicate that particular control logic should not be loaded, so that automatic re-loading of the particular control logic will not occur upon receipt of the next instance of a control signal.)

As another example, in an arrangement where a location determination is made and the control signal is sent in response to the location determination, a determination may be made that the device has moved out of the designated location. In response, a new control signal (e.g. a generic "revert" (or, equivalently, "reset") signal) may be sent to the device, which processor 60 may be programmed to respond to by undoing the change of control logic, switching back to the normal state of operation for instance. Other examples are possible as well.

3 Additional Examples

The exemplary embodiment of the present invention can thus be employed so as to cause a device to take on new application logic or other control logic while the device is in a designated location. In this regard, the exemplary embodiment can have broad use. Additional examples of uses of the invention include the following.

(a) Changing alert function. In a normal state, the device may emit an audible alert (e.g., ring signal—also known as alert or page) in response to a particular incoming signal structure (such as a CDMA alert signal for instance). When in a designated location, the device may receive a control signal that defines or points to control logic indicating that the device should not emit the audible alert in response to the particular incoming signal structure, and/or that the device should perform a different alert function (such as a vibration or visual alert) in response to the incoming signal structure. The device may switch to use that changed set of logic. Further, special alert signals (such as sounds, speech announcements, graphical displays, or the like), which may be particular to the location in which the device is positioned, may be invoked in response to an appropriate control signal.

(b) Changing language on a user interface. In a normal state, the device may respond to user actuation of a given keypad key by displaying an English language character on the display 82. When in a designated location, the device may receive a control signal that defines or points to logic indicating that the device should instead display a Japanese language character on the display.

(c) Changing to a general mode. A control signal may cause the device to switch to a general mode of operation. For instance, a control signal may be provided to the device to cause the device to enter a "quiet" mode. In that event, for example, the control signal might correlate to a set of "quiet" control logic particular for the device. The processor may then switch to use that control logic, which might cause the device to not emit sounds that it would normally emit (such as rings or beeps for instance). As another example, a control signal may be provided to the device to cause the device to enter a low-power or standby state, such as where certain functions of the device are not expected to be used. Other modes or themes could be implemented in a similar fashion.

(d) Facilitating communication via a special protocol. A control signal may cause the device to switch to employ a special session or transport protocol suitable for allowing communication with some other entity. For instance, in a movie theatre, transmitters may emit a control signal that can be received by devices in the theatre so as to cause the devices to communicate according to a predetermined protocol with a computer in the theatre, and further to run an application for displaying subtitles on display 82. The computer may then transmit subtitles to the device, according to the predetermined protocol, and the device may run the application so as to display the subtitles for viewing by a user, as a movie progresses.

As another example, when a device enters a particular location, the device may receive a control signal that causes the device to switch to control logic for communicating via a particular protocol with a video server. The video server may then be able to send video signals via that protocol to the device for display on the device, and the device may similarly be able to send video signals via that protocol to the video server. As still another example, the control signal may cause the device to engage in a predetermined type of handshaking or training sequence so as to establish communication with another entity. As yet a further example, the change in communication protocol could be a change from asynchronous communication to synchronous communications (e.g., switching between the asynchronous and synchronous protocols of the Bluetooth standard, for instance).

(e) Defining timing of functions. A control signal may cause the device to switch to a set of control logic that causes the device to engage in certain functions at the occurrence of certain times and/or dates (the occurrence of which may be viewed as types of primitives). For instance, the control logic may provide that the device should send a predetermined message out to a designated network address every two days.

(f) Altering or providing remote control functions. A universal remote-control (for controlling a variety of different equipment, such as stereos, televisions, lights, and computers) may receive a control signal in a designated location that automatically causes the remote-control to control a piece of equipment in the designated location. In one room, for instance, the remote-control may thus automatically send out a first signal structure to cause a first television to switch to Channel 5 in response to a user pressing a "5" key, and, in another room, the remote-control may automatically send out a second signal structure to cause a second television to switch to Channel 5 in response to the user pressing the "5" key. As another example, a cellular telephone or PDA with an infrared transmitter may receive a control signal in a designated location that causes the cellular telephone or PDA to operate as a remote control for a piece of equipment in the designated location.

4. CONCLUSION

An exemplary embodiment of the present invention has been described herein. It will be understood, however, that changes may be made to the various features described without departing from the true spirit and scope of the invention, as defined by the following claims.

For example, while the foregoing description refers to a device receiving a control signal as the device receiving the signal from an external source, it is alternatively possible that a device could embody location-determination functionality (e.g., GPS functions) and, in response to a determination that it is in a given location, could effectively provide itself a control signal. In response to that control signal, the device could then switch to a set of logic specific to the given location. For instance, the device could employ a boundary map established during an initial configuration or during an update or logic-change sent from a remote system.

As another example, while the foregoing description mainly describes the response that a device may have to a particular control signal, it is possible that different devices may respond differently to the same control signal. For instance, one device may responsively switch to control logic that causes the device to act as a television remote control, while another device may responsively switch to control logic that causes the keys on the device to light up when pressed. (E.g., one device might responsively employ different primitives than another device.)

As still another example, while the foregoing mainly describes a device switching control logic in response to a control signal, the act of "switching" or "changing" control logic could involve simply adding control logic, while maintaining existing control logic. Thus, new application layer features might be added to a device, whether or not other features of the device are changed in any way. Other examples are possible as well.

I claim:

1. A method of altering operation of a device based on location, the device having default control logic that causes the device to present an audible alert signal when the device receives a ring signal, the method comprising in combination:
   (i) when the device is in a given location, the device receiving from a first entity a control signal associated with the given location and the device responsively asking a second entity for a set of alternative control logic to be executed by the device when the device receives the ring signal, wherein the first entity comprises at least one transmitter radiating the control signal in a radiation pattern defining a boundary of the given location, and wherein the alternative control logic causes the device to present a vibration alert signal when the device receives the ring signal;
   (ii) the device receiving the set of alternative control logic from the second entity;
   (iii) the device storing the set of alternative control logic in data storage;
   (iv) the device thereafter receiving the ring signal and responsively applying the alternative control logic to present the vibration alert signal rather than applying the default control logic to present the audible alert signal; and
   (v) upon a predetermined duration after the device has exited the given location, the device reverting to a mode in which the device applies the default control logic rather than the alternative control logic.

2. The method of claim 1, wherein applying the default control logic to present the audible alert signal comprises emitting a first predetermined signal structure, and wherein applying the alternative control logic to present the vibration alert signal comprises emitting a second predetermined signal structure.

3. The method of claim 1, wherein applying the default control logic to present the audible alert signal comprises presenting a first predetermined signal perceptible to a user, and wherein applying the alternative control logic to present the vibration alert signal comprises presenting a second predetermined signal perceptible to a user.

4. The method of claim 1, further comprising:
   flagging the alternative set of control logic as an active set of control logic; and
   after receiving the control signal but before flagging the alternative set of control logic as the active set of control logic, prompting a user of the device to approve change in function of the device, and receiving a user response indicating whether or not the user approves.

5. The method of claim 1, further comprising:
   the device determining its position within the given location, and
   the device sending a position determination message to the first entity so as to communicate the position of the device to the first entity.

6. The method of claim 5, further comprising:
   the device receiving, from a global positioning system, signals for determining the position of the device.

7. The method of claim 1,
   wherein the device is associated with a given network address,
   wherein the control signal is addressed to the given network address, and wherein the device receives the control signal in response to the control signal being sent to the given network address.

8. The method of claim 7, wherein the given network address comprises an Internet Protocol (IP) address.

9. The method of claim 1, wherein the boundary of the given location substantially coincides with a room of a building.

10. The method of claim 9, wherein the at least one transmitter is disposed within the room of the building.

11. The method of claim 1, wherein the boundary of the given location substantially coincides with a movie theater.

12. The method of claim 11, wherein the at least one transmitter is disposed behind a movie screen.

13. The method of claim 1, wherein the given location comprises at least one location selected from the group consisting of: (i) a movie theater, (ii) a conference room, (iii) a church, (iv) a school, (v) a library, (vi) a hotel, (vii) a hotel room, (viii) a stadium, (ix) an amusement park, (x) an aircraft cabin, (xi) a house, (xii) a floor in a building, (xiii) a room in a building, and (xiv) a stretch of a road.

14. The method of claim 1, wherein the at least one transmitter comprises an infrared transmitter.

15. The method of claim 1, wherein the at least one transmitter comprises a radio frequency transmitter.

16. The method of claim 1,
wherein the at least one transmitter is local to the given location,
the method further comprising:
associating the control signal with the given location by emitting the control signal from the at least one transmitter local to the given location.

17. The method of claim 1, further comprising:
detecting presence of the device in the given location; and
responsively sending the control signal to the device in the given location.

18. A method of altering operation of a device based on location, the device having default control logic that causes the device to present an audible alert signal when the device receives a ring signal, the method comprising in combination:
(i) when the device is in a given location, the device receiving from a first entity a control signal associated with the given location and the device responsively asking a second entity for a set of alternative control logic to be executed by the device when the device receives the ring signal, wherein the first entity is an entity selected from the group consisting of: (i) a mobile switching center (MSC), (ii) a base station controller (BSC), and (iii) a service control point (SCP), and wherein the alternative control logic causes the device to present a vibration alert signal when the device receives the ring signal;
(ii) the device receiving the set of alternative control logic from the second entity;
(iii) the device storing the set of alternative control logic in data storage;
(iv) the device thereafter receiving the ring signal and responsively applying the alternative control logic to present the vibration alert signal rather than applying the default control logic to present the audible alert signal; and
(v) upon a predetermined duration after the device has exited the given location, the device reverting to a mode in which the device applies the default control logic rather than the alternative control logic.

19. The method of claim 18, wherein applying the default control logic to present the audible alert signal comprises emitting a first predetermined signal structure, and wherein applying the alternative control logic to present the vibration alert signal comprises emitting a second predetermined signal structure.

20. The method of claim 18, wherein applying the default control logic to present the audible alert signal comprises presenting a first predetermined signal perceptible to a user, and wherein applying the alternative control logic to present the vibration alert signal comprises presenting a second predetermined signal perceptible to a user.

21. The method of claim 18, further comprising:
flagging the alternative set of control logic as an active set of control logic; and
after receiving the control signal but before flagging the alternative set of control logic as the active set of control logic, prompting a user of the device to approve change in function of the device, and receiving a user response indicating whether or not the user approves.

22. The method of claim 18, further comprising:
the device determining its position within the given location, and
the device sending a position determination message to the first entity so as to communicate the position of the device to the first entity.

23. The method of claim 22, further comprising:
the device receiving, from a global positioning system, signals for detemrning the position of the device.

24. The method of claim 18,
wherein the device is associated with a given network address,
wherein the control signal is addressed to the given network address, and
wherein the device receives the control signal in response to the control signal being sent to the given network address.

25. The method of claim 18, wherein the given location comprises at least one location selected from the group consisting of: (i) a movie theater, (ii) a conference room, (iii) a church, (iv) a school, (v) a library, (vi) a hotel, (vii) a hotel room, (viii) a stadium, (ix) an amusement park, (x) an aircraft cabin, (xi) a house, (xii) a floor in a building, (xiii) a room in a building, and (xiv) a stretch of road.

26. The method of claim 18, further comprising:
detecting presence of the device in the given location; and
responsively sending the control signal to the device in the given location.

* * * * *